Patented Mar. 8, 1938

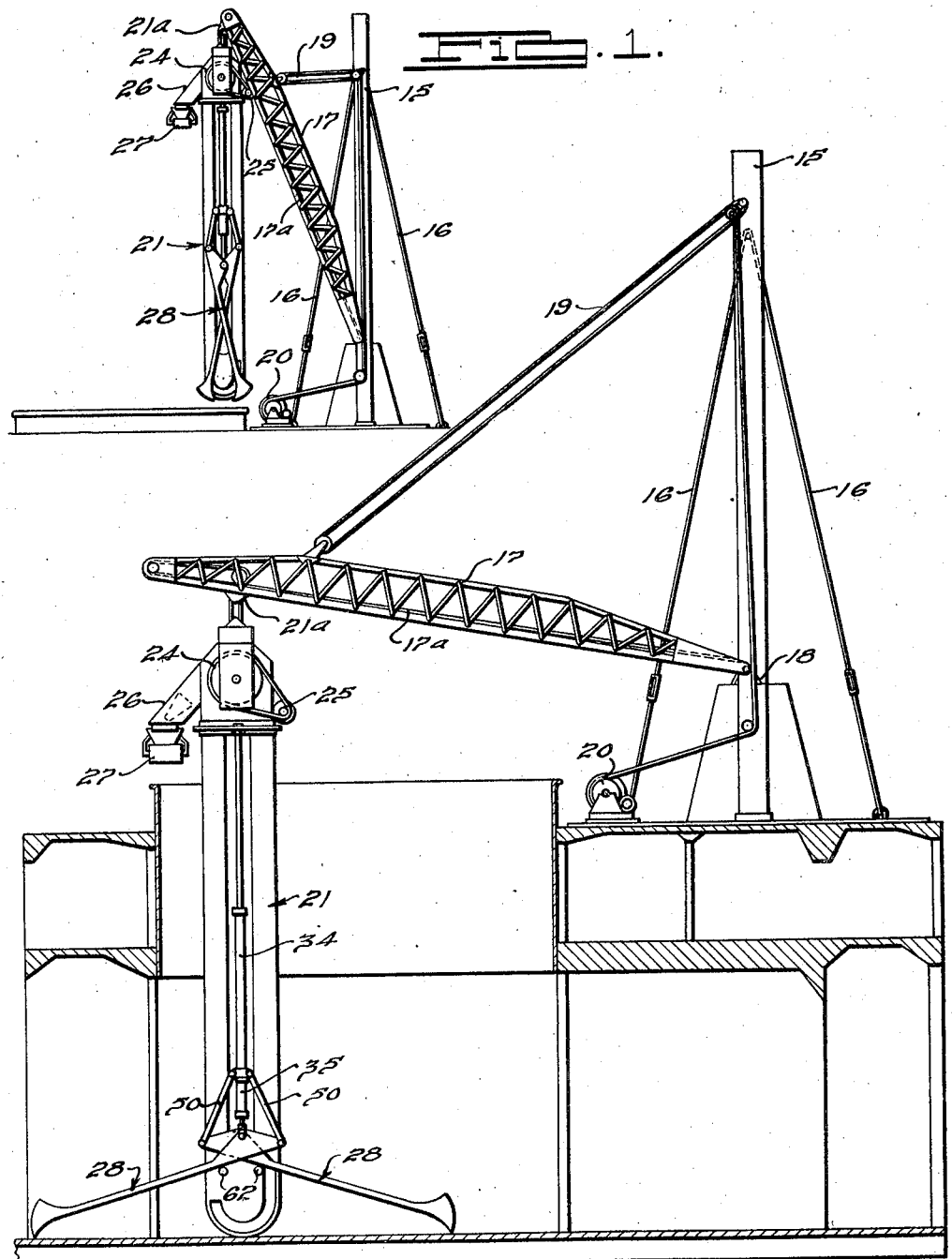

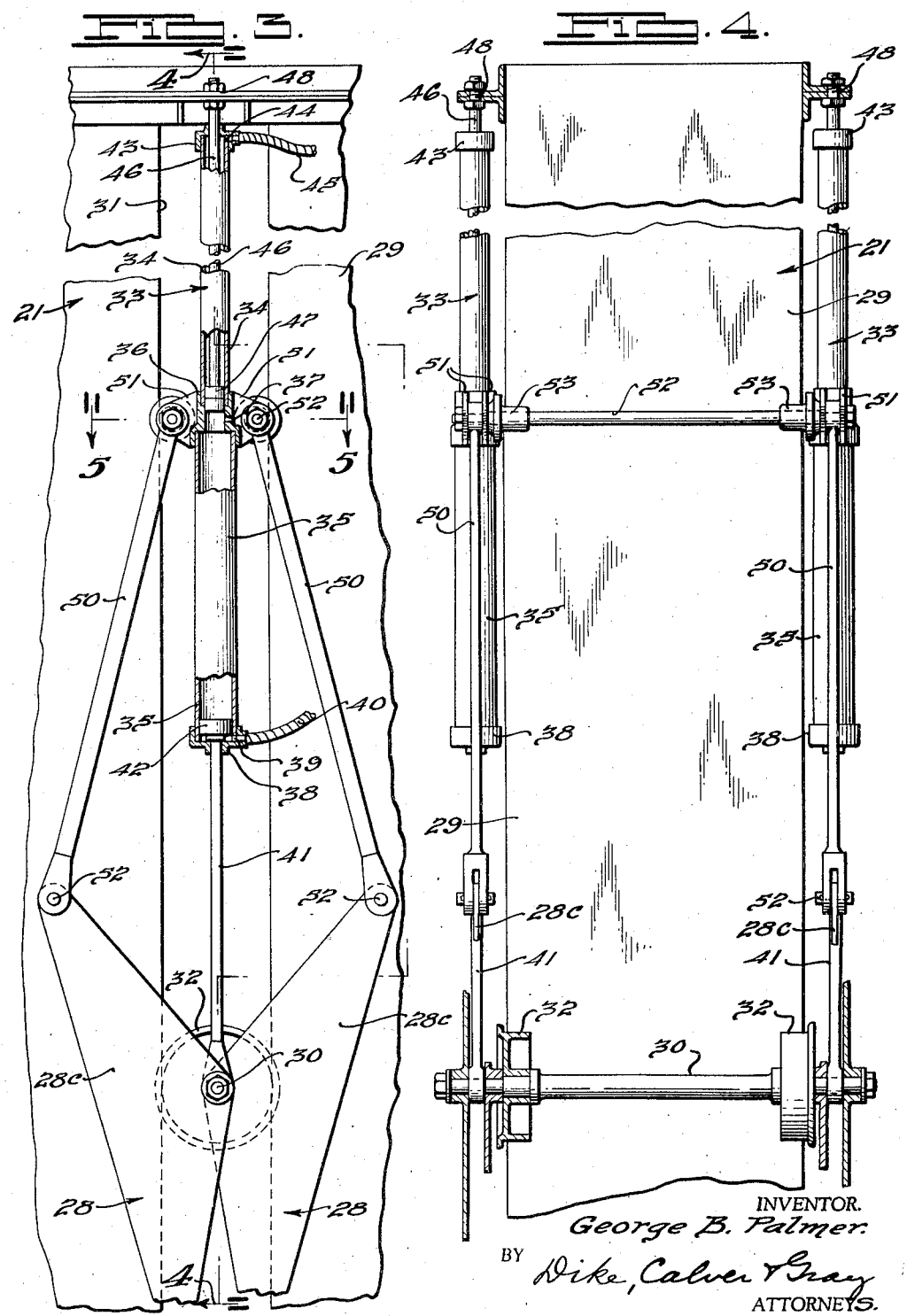

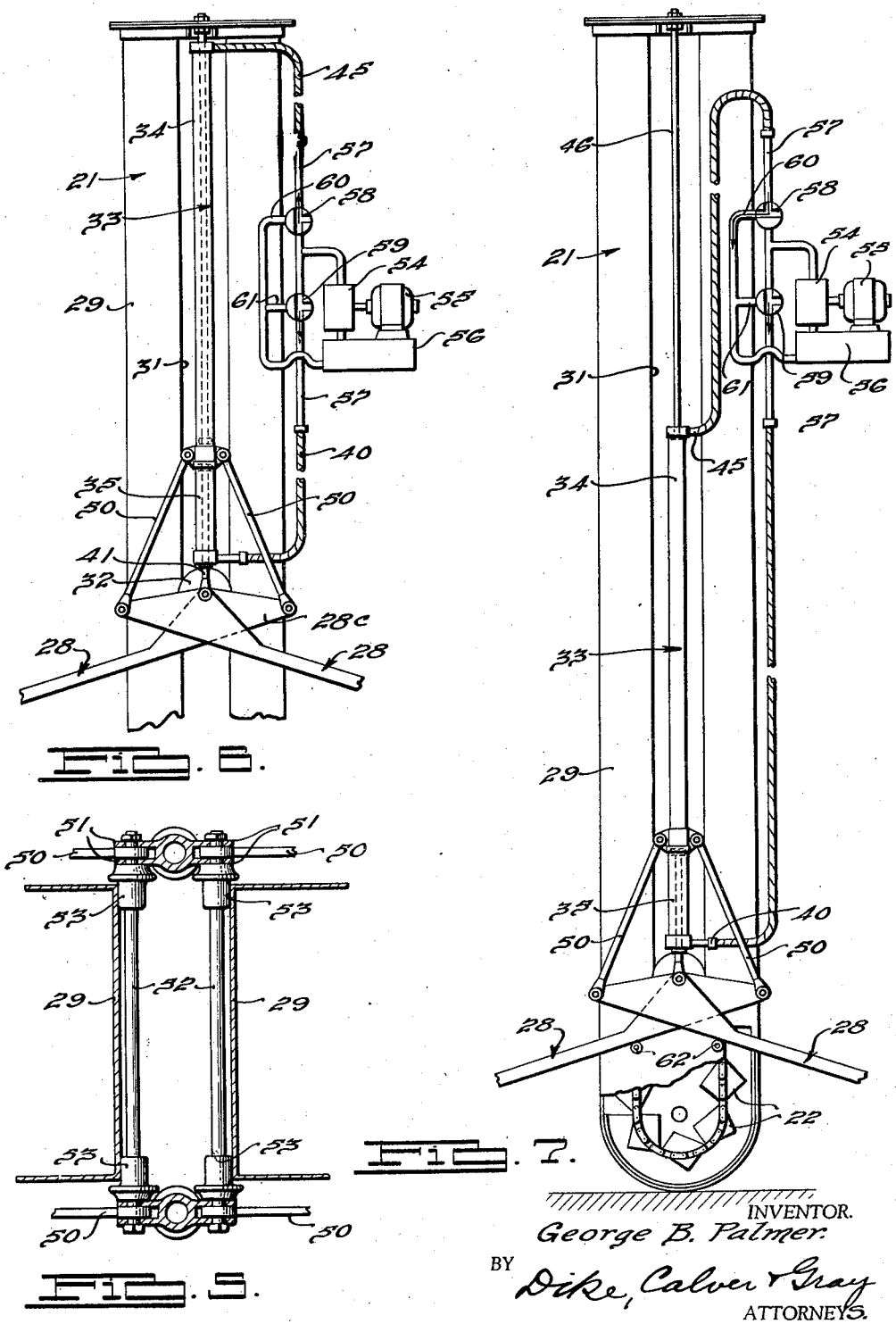

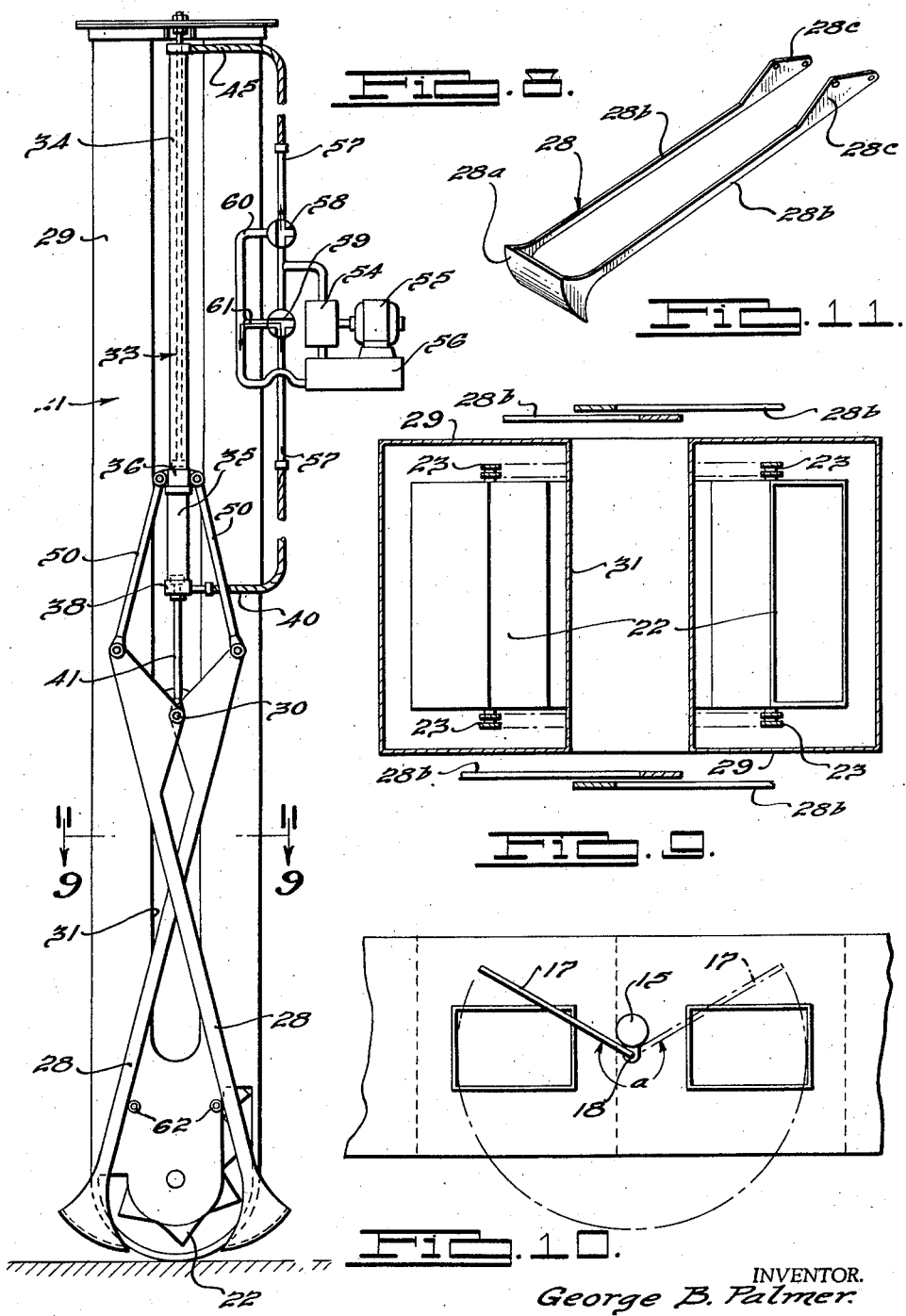

2,110,737

UNITED STATES PATENT OFFICE 2,110,737

MATERIAL HANDLING DEVICE

George B. Palmer, Grosse Ile, Mich.

Application October 10, 1936, Serial No. 105,036

21 Claims. (Cl. 214—116)

This invention relates to devices for handling bulk materials, such as ore, sand, gravel, coal, grain, salt and the like, and more particularly to an apparatus adapted for discharging or removing such materials from bins or containers, such as cargo holds of barges and ships.

In handling materials of the above character it has been common to employ elevators of the bucket type suitably supported and adapted to be lowered into a material holding bin or pit, and be moved therein in order to remove all the material contained in such bin or pit. It has been found in the process of unloading such materials that the material ceases to flow after the angle of repose is reached and that the elevator or conveyor buckets or flights will only partially fill unless they are surcharged to some distance above the top of said buckets or flights, which circumstance usually necessitates moving the material in the hold, usually by hand shovelling, towards the receiving end of the elevator or conveyor. In view of the extreme difficulty and danger connected with manual performance of the above task, numerous attempts have been made to provide mechanical means for hauling or drawing the material toward the receiving end of the elevator, thus increasing the area served thereby. However, serious difficulties have been encountered in providing practical and efficient means of the above character, and structures heretofore provided have shown many disadvantages. In one type of construction most commonly used for discharging grain four scrapers are used, each of them requiring a special attendant for drawing it back from the elevator and guiding it. The fifth man is required at the elevator control to operate the winch for hauling the scrapers. Because of the difficulty of working amongst the cargo the scraper attendants have to be frequently relieved and, therefore, nine men working in relays are usually required to operate one elevator at the rate of only about 30% of its full discharge capacity.

One of the objects of the present invention is to provide a novel and improved material handling and discharging apparatus having a material raising elevator or conveyor or other means of raising or moving material in which means are provided for drawing the material toward the receiving end of the elevator or conveyor or the like, said apparatus being capable of operation from a point remote from the receiving or loading end of the elevator and preferably by a single operator.

Another object of the invention is to provide a material handling device of the foregoing character, having means for drawing the material toward the receiving end of the elevator at a rate ensuring continuous operation of the elevator at substantially its full discharge capacity.

A still further object of the invention is to provide a novel material handling and discharging apparatus operable from a single post located outside of the material hold, thus eliminating the necessity of having men working amongst the bulk of the material handled.

A further object of the invention is to provide a material handling apparatus having a material raising elevator or conveyor provided with delivering scrapers which are hydraulically operated and controlled.

An additional object of the invention is to provide an improved material handling apparatus of the above character which is relatively simple in construction, efficient in operation and is easy to operate and maintain in operative order.

Other objects of this invention will appear in the following description and appended claims, reference being had to the accompanying drawings forming a part of this specification wherein like reference characters designate corresponding parts in the several views.

Fig. 1 is a side elevation of the material handling device embodying the present invention, the same being shown with the elevator raised and scraper jaws closed.

Fig. 2 is a side elevation of the material handling device, the same being shown with the elevator lowered into a cargo hold, the latter being shown in longitudinal section.

Fig. 3 is a side elevation, partly in section, of the hydraulic mechanism for operating the scrapers.

Fig. 4 is a side elevation, partly in section, showing an arrangement of scraper operating cylinders at the sides of the elevator structure.

Fig. 5 is a transverse horizontal sectional view taken on lines 5—5 of Fig. 3 in the direction of the arrows.

Fig. 6 is a side elevation of the scraper, the same being raised and its arms extended, the hydraulic circuit and positions of the control valves for effecting the above position of the scraper being shown diagrammatically.

Fig. 7 is a side elevation of the lower portion of the elevator, the scraper being shown in its lowermost position with the arms extended.

Fig. 8 is a side elevation of the lower portion of the elevator, the scraper being shown raised with its arms closed.

Fig. 9 is a transverse horizontal sectional view of the elevator taken on line 9—9 of Fig. 8 in the direction of the arrows.

Fig. 10 is a diagrammatic plan of the mast and boom arrangement for serving two adjacent cargo holds.

Fig. 11 is a fragmentary perspective view of one jaw of the scraper.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The material handling apparatus constructed in accordance with the invention comprises generally a material raising elevator suitably suspended from a boom, crane or the like, and adapted to be lowered into a material holding container, bin or the like. The material receiving end of the elevator is provided with a scraper adapted to haul the material toward said receiving end. The arms of the scraper are operated by a toggle linkage which is adapted to raise the arms of the scraper, spread them apart, lower the scraper and to draw the arms together. The linkage may be operated in any suitable way. I prefer to use hydraulic means, although I do not desire to limit myself to such means, since use of mechanical means such, for example, as cables and pulleys may be equally advantageous in some specific instances.

Referring to the drawings, there is illustrated therein, by way of example, a vessel unloading apparatus, embodying the present invention equipped with hydraulic scraper operating mechanism. Referring more particularly to Figs. 1 and 2, the device illustrated therein comprises a conventional vessel unloading derrick consisting of a vertically extending mast 15 rigidly set in the upper deck structure of a freight vessel and supported by means of a plurality of rope or wire guys 16. A gaff or boom 17 is pivoted at its lower end to a bracket 18 secured to one side of said mast 15 near the foot thereof. The other end of the boom 17 is supported by a cable 19 passing through a plurality of sheaves, which cable is operated by a power driven winch 20 and serves for the purpose of regulating the vertical angle of said boom. The boom 17 is adapted to be swung through a horizontal angle "a" (see Fig. 10) and, therefore, by a proper combination of vertical and horizontal angles of the boom and the position of the trolley 21a along the rail 17a of the boom practically any point within the maximum area swept by the boom may be reached. A material raising elevator, in the present instance of the conventional bucket type, indicated generally by the numeral 21, is suitably supported at the outer end of the boom 17. I prefer to suspend the elevator from a trolley, such as indicated at 21a, with a swivel connection so that the elevator with its scrapers may rotate about its vertical center line, said trolley being adapted to travel along a suitable rail 17a provided in the boom 17, the position of said trolley being controlled with the aid of suitable cables. The elevator is adapted to lift the material flowing into its lower end or boot with the aid of a plurality of buckets 22 secured to endless chains 23 passing around suitable sprocket wheels 24 (Fig. 7), the upper of said sprocket wheels 24 being driven with the aid of a chain drive from a motor 25 (Fig. 1). The material raised by the buckets 22 is discharged at the top of the elevator into a chute 26 by which it may be delivered unto a conveyor or a trough 27 and conveyed to any desired destination.

It is an important feature of the present invention that as the material in proximity to the elevator boot is removed and the gravity flow of the material ceases or becomes insufficient to deliver the material to the elevator boot, the specially provided means controlled by a single operator haul the material to the elevator boot, thus ensuring complete filling of the buckets and enabling the elevator to operate substantially at its full capacity during the entire period of operation.

In the present embodiment of the invention said means are exemplified by a two-jaw scraper operatively mounted on the elevator structure. Referring to Figs. 2, 7 and 11, said scraper comprises two similar jaws 28, each of them having a lip portion 28a and two arms 28b which embrace both sides of the elevator casing 29. The jaws 28 are hingedly connected together by means of a shaft 30 extending through the recess 31 provided in the elevator casing 29, said shaft being adapted to move vertically in said recess, being guided by rollers 32.

Means for actuating said jaws 28 are, in the present instance, of hydraulic type, and referring to Figs. 3 and 4, the same comprise two similar cylinder assemblies 33 arranged at both sides of the elevator casing 29. Each of said assemblies 33 comprises two co-axially arranged cylinders 34 and 35 connected together by means of an adapter or coupling 36 provided with a vent 37. The lower end of the cylinder 35 has a cover or end cap 38 which has a port 39 at which there is secured a flexible conduit 40. The end cap also has a centrally located hole for the passage of a piston rod 41. The lower end of each piston rod 41 is secured to one end of the shaft 30, while its upper end carries a piston 42 slidably fitted in the cylinder 35.

The upper end of the cylinder 34 has a similar cover or cap 43 having a port 44 at which there is secured a flexible conduit 45. The cap also has a centrally located hole for the passage of a piston rod 46 carrying at its lower end a piston 47 slidably fitted in the cylinder 34. The upper end of said rod 46 is secured to the elevator casing 29, as indicated at 48.

The scraper arms 28b are provided with portions 28c extending beyond the hinged connection of the jaws. To the respective extremities of said portions are hingedly connected the lower ends of two links 50, the opposite ends of which are hinged to ears or bosses 51 projecting at opposite sides of the adapter 36. Said connections are effected with the aid of two shafts 52, which shafts are also utilized for the purpose of securing together the cylinder assemblies 33 arranged at the opposite sides of the elevator casing 29, as mentioned. A plurality of rollers 53 are provided for the purpose of guiding the vertical movements of the shafts 52.

From an examination of Fig. 4 it will be apparent that cylinder assemblies 33, although secured together, are not secured to the elevator casing 29 and hence they can move longitudinally thereof, being guided by the upper connecting rods 46. Accordingly, it will be seen that the position of the piston 47 is fixed with respect to the elevator casing 29 while the position of the piston 42 may be changed in relation to said casing. Piston 47 serves for the purpose of raising and lowering the scraper bodily, while piston 42 serves only for the purpose of spreading the scraper jaws and holding the same in any position of spread. If a liquid, such as oil or water, is pumped through the port 44 into the cylinder 34, the entire assembly 33 will rise, carrying the scrapers upward. Because of the provision of the vent 37, said upward movement of the cylinder assembly 33 does not affect the extent of spreading of the scraper arms, provided the port 39 is closed or there is a sufficient pressure in the cylinder 35 to prevent downward movement of the piston 42.

On the other hand, if liquid is pumped into the cylinder 35 and the port 44 of the cylinder 34 is closed or there is a sufficient pressure in said cylinder 34, the upward pressure upon the piston 42 will result in raising the same, and the rod 41 by exerting a pull on the shaft 30 will raise said shaft, spreading the scraper arms apart. The length of the stroke of the piston 42 is so selected that when said piston is in its uppermost position in the cylinder the jaws of the scraper are spread fully apart.

It will be noted that due to the manner of linkage and operation of the actuating mechanism, when scraper jaws 28 are spread by raising hinged joint 30 and holding adapter 36 stationary the scraper jaws 28 then pass through a shorter radius than when being closed by raising adapter 36 and allowing hinge 30 to be stationary or seek its own level depending on the contour of the pile.

The hydraulic circuit controlling the cylinders 34 and 35 is shown diagrammatically in Figs. 6, 7 and 8, and referring thereto, the same comprises a suitable power driven pump, preferably an electrically driven centrifugal pump, such as an aggregate comprising pump 54 and motor 55. The pressure side of said pump 54 is connected to the ports 39 and 44 of the cylinders 35 and 34, respectively. In proximity to said cylinders, said connection is effected with the aid of flexible hoses, as mentioned, to provide for movements of the cylinder assemblies 33. The suction side of said pump 54 is connected to a supply reservoir 56. The pressure main 57 includes two three-way control valves 58 and 59 to which are connected conduits 60 and 61 leading to the return line discharging into the supply reservoir 56. The valve 58 controls operation of the scraper-raising piston 47, while the jaw-spreading piston 42 is controlled by the valve 59, said valves being conveniently located at the operator's post. The pump may be mounted on shafts 52 so as to maintain its relative position with reference to cylinders 34 and 35, in which case flexible piping would be unnecessary.

Fig. 6 illustrates the respective positions of the control valves and pistons when the scrapers are raised all the way up and their jaws are spread apart. In such condition the valves are set to transmit liquid pressure to both cylinders 34 and 35, and to cut off communication of said cylinders with the return line.

For lowering the scraper unto the heap of material the valve 58 is set to effect communication of the cylinder 34 with the return line 60 (see Fig. 7). In such conditions, the weight of the scraper will move the entire cylinder assembly 33 together with the scraper downward until the jaws of the scraper rest against the material. When it is desired to draw the material toward the elevator boot, the valve 58 is set to transmit liquid pressure into the cylinder 34, while the valve 59 is set to provide communication between the cylinder 35 and the return line. In such condition the cylinder assembly will rise and the links 50 will pull on the hinges, closing the jaws 28 of the scraper and drawing the material toward the elevator boot. The liquid contained in the cylinder 35 is forced out through the conduit 57, valve 59 and conduit 61 into the return line, and the scraper assumes the position shown in Fig. 8.

For opening the jaws pressure is admitted to the cylinders 34 and 35 as explained. In some instances it may be desirable to adapt valve 58 or provide an additional valve for closing at such time the conduit 45 completely, locking the liquid contained in the cylinder 34 and preventing the cylinder assembly from moving slightly downward because of the cylinder reaction, before the arms of the scraper are fully spread. In the present embodiment such downward movement of the jaws is prevented by stop rollers 62 provided on the elevator casing at the boot of the elevator, which assist valve 59 in preventing closing of the scraper arms as the scraper begins to move downward. These stop rollers may, however, be dispensed with particularly in cases where it is desirable to permit the scrapers to drop below the bottom of the elevator boot.

Although only one embodiment of my invention has been illustrated and described, the same is capable of many modifications, particularly in the method of supporting the elevator. For example, the elevator may be suspended on a trolley from a travelling bridge, from a boom of a yard jib crane, or a locomotive crane, and the like. The herein described hydraulic scraper operating means may be substituted by a cable attached to the shaft 30 which will operate to raise the scraper. Opening of the jaws may be effected by a stop provided on the elevator casing 34 near the upper end of the scraper travel and bearing upon the member connecting the upper ends of the links 50, so that pulling on the shaft 30 after the scraper is raised to a predetermined position will operate to press on said links connecting member and to open the arms. A suitable dog for automatically locking the arms in open position may be provided in such structure, the same being adapted to be manually unlocked from a remote point.

I claim:

1. In a material handling apparatus, the combination of an elevator conveyor, a pair of scraper carrying members pivotally supported on the elevator, means connected to the upper ends of said members for swinging the same in a predetermined direction, means connected to the members intermediate their ends for swinging said members in the opposite direction, and power mechanism for selectively controlling said means, said scraper members terminating at their lower ends in jaws movable toward and from the elevator boot upon swinging the members.

2. In a material handling apparatus, the combination of an elevator conveyor, a pair of scraper carrying members pivotally supported on the elevator, means connected to the upper ends of said members for swinging the same in a predetermined direction, means connected to the members intermediate their ends for swinging said members in the opposite direction, and remotely controlled hydraulically operated mechanism for selectively controlling said means, said scraper carrying members terminating at their lower ends in scraper jaws disposed at opposite sides of the elevator boot and movable toward and from the boot upon swinging the members.

3. In a material handling device, a bucket elevator, a two-jaw scraper operatively arranged on said elevator for hauling the material to the receiving end of said elevator, a toggle linkage connected to the jaws of said scraper, a hydraulic cylinder, two pistons slidably fitted in said cylinder, one of said pistons adapted to raise the scraper to a predetermined height and the other being adapted to open and to close selectively the jaws of said scraper.

4. A material handling device comprising a bucket elevator adapted to be lowered unto a heap of loose material, a two-jaw scraper operatively arranged at the lower portion of said elevator for hauling the material to the receiving end of said elevator, a shaft hingedly connecting the jaws of said scraper and adapted to be selectively raised and lowered in a longitudinal recess provided in the casing of said elevator, two links hingedly connected to said jaws on each side of said shaft and to each other at their upper ends and adapted to open said jaws when pressure is applied to their connected ends.

5. A material handling device comprising a bucket elevator adapted to be lowered unto a heap of loose material, a two-jaw scraper operatively arranged at the lower portion of said elevator for hauling the material to the receiving end of said elevator, a shaft hingedly connecting the jaws of said scraper and adapted to be selectively raised and lowered in a longitudinal recess provided in the casing of said elevator, two links hingedly connected to said jaws on each side of said shaft and to each other at their upper ends and adapted to open said jaws when pressure is applied to their connected ends, means for selectively raising and lowering said shaft, and means for applying pressure to said connected ends.

6. A material handling device comprising a bucket elevator adapted to be lowered unto a heap of loose material, a two-jaw scraper operatively arranged at the lower portion of said elevator for hauling the material to the receiving end of said elevator, a shaft hingedly connecting the jaws of said scraper and adapted to be selectively raised and lowered in a longitudinal recess provided in the casing of said elevator, two links connected to said jaws on each side of said shaft and to each other at their upper ends and adapted to open said jaws when pressure is applied to their connected ends, two co-axial hydraulic cylinders mechanically secured together and to the connected ends of said links, two pistons with piston rods slidably fitted in said cylinders respectively, one of said pistons adapted to raise and lower selectively said shaft and the other of said pistons operating to cause pressure to be applied to the connected ends of said links.

7. A material handling device comprising a bucket elevator adapted to be lowered unto a heap of loose material, a two-jaw scraper operatively arranged at the lower portion of said elevator for hauling the material to the receiving end of said elevator, a shaft hingedly connecting the jaws of said scraper and adapted to be selectively raised and lowered in a longitudinal recess provided in the casing of said elevator, two links hingedly connected to said jaws on each side of said shaft and to each other at their upper ends and adapted to open said jaws when pressure is applied to their connected ends, two co-axial vertically extending hydraulic cylinders mechanically secured together and to the connected ends of said links, two pistons with piston rods, said pistons being slidably fitted in said cylinders, the rod of the lower piston being connected to said shaft, and the rod of the upper piston being fixed on the elevator casing.

8. In a material handling apparatus, the combination of a material raising elevator, a pair of scraper jaws disposed at opposite sides of the boot of the elevator at the front and back thereof, mechanism for moving said jaws outwardly from the elevator boot and relatively thereto to spread the jaws and for drawing the same inwardly toward the elevator boot to drag material thereto, and means for supporting said mechanism upon the elevator.

9. In a material handling apparatus, the combination of a substantially vertically extending material raising elevator, a pair of scraper jaws disposed at opposite sides of the boot of the elevator at the front and back thereof, mechanism for moving said jaws outwardly from the elevator boot and relatively thereto to spread the jaws and for drawing the same inwardly toward the elevator boot to drag material in a substantially horizontal direction thereto, and means for supporting said mechanism upon the elevator.

10. In a material handling apparatus, the combination of a material raising elevator, a scraper jaw disposed at one side of the boot of the elevator and having an upwardly extending arm, means carried by the elevator for supporting said jaw and movable in a vertical direction for moving said jaw toward the elevator boot and relatively thereto in substantially a horizontal direction to cause said jaw to drag material to the elevator boot throughout the major part of the travel of the scraper jaw and without interfering with the operation of the elevator; said means also being operative to move said jaw away from the elevator boot.

11. In a material handling apparatus, the combination of a material raising elevator, a pair of scraper jaws disposed opposite to each other at the front and back sides of the boot of the elevator, means carried by the elevator for supporting and moving said jaws toward the elevator boot and relatively thereto in substantially a horizontal direction to cause said jaws to drag material to the elevator boot throughout the major part of the travel of the scraper jaws and without interfering with the operation of the elevator; said mechanism also being operative to move said jaws away from the elevator boot.

12. In a material handling apparatus, the combination of a material raising elevator, a pair of scraper jaws disposed at opposite sides of the lower end of the elevator adjacent the elevator boot, mechanism carried by the elevator for spreading said jaws and also for moving said jaws toward the elevator and relatively thereto to cause said jaws to drag material in substantially horizontal directions to the elevator boot without interfering with the operation of the elevator; said mechanism including upwardly extending arms attached to each jaw at their lower ends and embracing said elevator.

13. In a material handling apparatus, the combination of a material raising elevator, a pair of scraper jaws disposed at opposite sides of the lower end of the elevator adjacent the elevator boot, mechanism carried by the elevator for spreading said jaws and also for moving said jaws toward the elevator and relatively thereto to cause said jaws to drag material in substantially horizontal directions to the elevator boot without interfering with the operation of the elevator; said mechanism including upwardly extending arms attached to each jaw at their lower ends and embracing said elevator, and means for pivotally connecting the arms adjacent their upper ends.

14. In a material handling apparatus, the combination of a material raising elevator, a pair of scraper jaws disposed at opposite sides of the lower end of the elevator adjacent the elevator boot, mechanism carried by the elevator for spreading said jaws and also for moving said jaws toward the elevator and relatively thereto to cause said jaws to drag material in substantially horizontal directions to the elevator boot without interfering with the operation of the elevator; said mechanism including a pair of arms secured at their lower ends to each jaw and extending upwards in crossed relation at opposite sides of the elevator.

15. In a material handling apparatus, the combination of a material raising elevator, a pair of scraper jaws disposed at opposite sides of the lower end of the elevator adjacent the elevator boot, mechanism carried by the elevator for spreading said jaws and also for moving said jaws toward the elevator and relatively thereto to cause said jaws to drag material in substantially horizontal directions to the elevator boot without interfering with the operation of the elevator; said mechanism including a pair of arms secured at their lower ends to each jaw and extending upwards in crossed relation at opposite sides of the elevator, a common means for pivotally supporting said arms intermediate their ends and raising and lowering means separately connected to the upper ends of the arms.

16. In a material handling apparatus, the combination of a material raising elevator, a pair of scraper jaws disposed at opposite sides of the lower end of the elevator adjacent the elevator boot, mechanism carried by the elevator for spreading said jaws and also for moving said jaws toward the elevator and relatively thereto to cause said jaws to drag material in substantially horizontal directions to the elevator boot without interfering with the operation of the elevator; said mechanism comprising upwardly extending crossed arms secured to the jaws at their lower ends, raising and lowering means having a common connection to said arms intermediate their ends, and raising and lowering means separately connected to the upper ends of said arms.

17. In a material handling apparatus, the combination of a horizontally swinging boom, a vertically extending elevator, a trolley for supporting the upper end of the elevator from the boom to permit travel thereof longitudinally of the boom, a pair of scraper jaws oppositely disposed at opposite sides of the lower end of the elevator adjacent the elevator boot, arms supporting said jaws and extending upwards in converging relation at opposite sides of the elevator, mechanism carried by the elevator for raising and lowering the upper ends of the arms in unison to spread the jaws away from the elevator or to move the jaws relatively to the elevator to drag material in substantially horizontal directions to the boot of the elevator.

18. In a material handling apparatus, the combination of a horizontally swinging boom, a vertically extending elevator, a trolley for supporting the upper end of the elevator from the boom to permit travel thereof longitudinally of the boom, a pair of scraper jaws oppositely disposed at opposite sides of the lower end of the elevator adjacent the elevator boot, and mechanism on the elevator for moving said jaws outwardly away from the elevator and also for moving the jaws toward the elevator to drag material in substantially horizontal directions to the elevator boot.

19. In a material handling apparatus, the combination of a material raising elevator, a scraper jaw disposed at one side of the boot of the elevator, an upwardly extending arm carrying said jaw, mechanism for bodily raising said jaw, for moving said jaw outwardly from the elevator boot and relatively thereto and also for drawing the same inwardly toward the elevator boot to drag material in substantially a horizontal direction thereto, said mechanism comprising devices pivotally connected at spaced points to said arm.

20. In a material handling apparatus, the combination of a material raising elevator, a scraper jaw disposed at one side of the boot of the elevator, an upwardly extending arm carrying said jaw, mechanism for bodily raising said jaw, for moving said jaw outwardly from the elevator boot and relatively thereto and also for drawing the same inwardly toward the elevator boot to drag material in substantially a horizontal direction thereto, said mechanism comprising devices pivotally connected at spaced points to said arm, and means for moving each device in a vertical direction independently of the other.

21. In a material handling apparatus, the combination of a material raising elevator, a scraper jaw disposed at one side of the boot of the elevator, an upwardly extending arm carrying said jaw, actuating means for said jaw to effect movement of the jaw toward and from the elevator boot and relatively thereto comprising a device movable in a vertical direction and pivoted adjacent the upper end of the arm, said arm being pivotally supported upon the elevator to swing about a substantially horizontal axis.

GEORGE B. PALMER.